O. F. SMITH.
FURROW OPENER ATTACHMENT.
APPLICATION FILED JAN. 26, 1915.
1,159,115.
Patented Nov. 2, 1915.
2 SHEETS—SHEET 2.
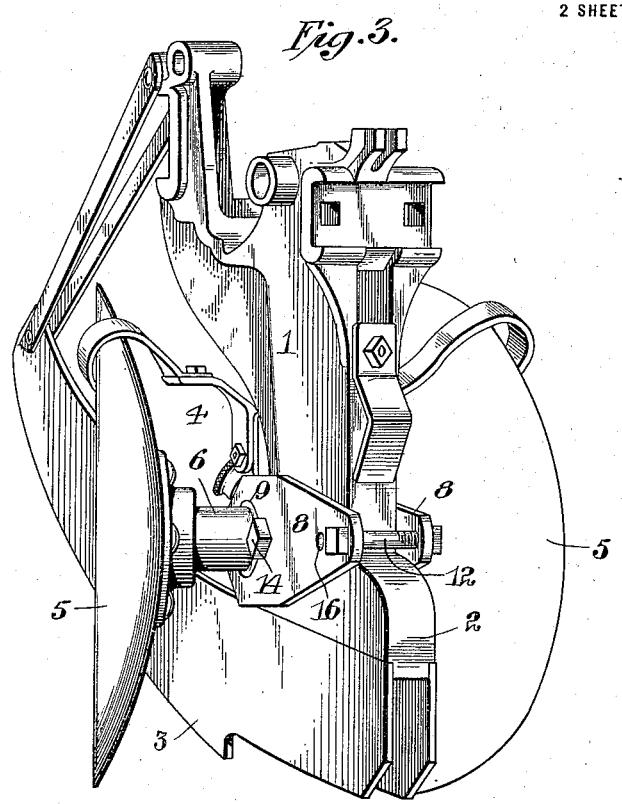
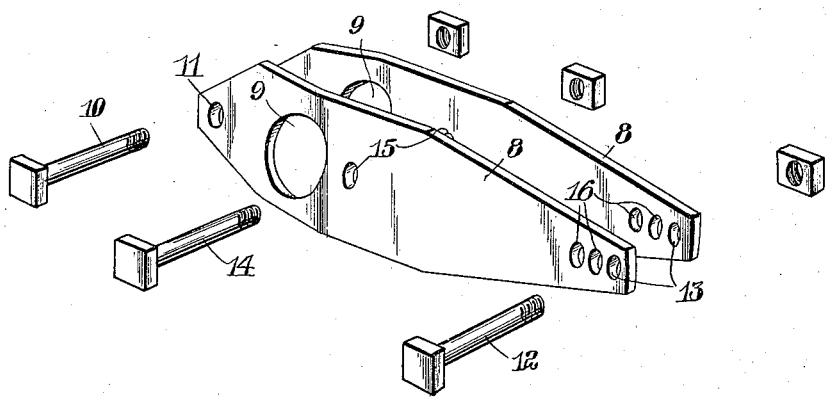

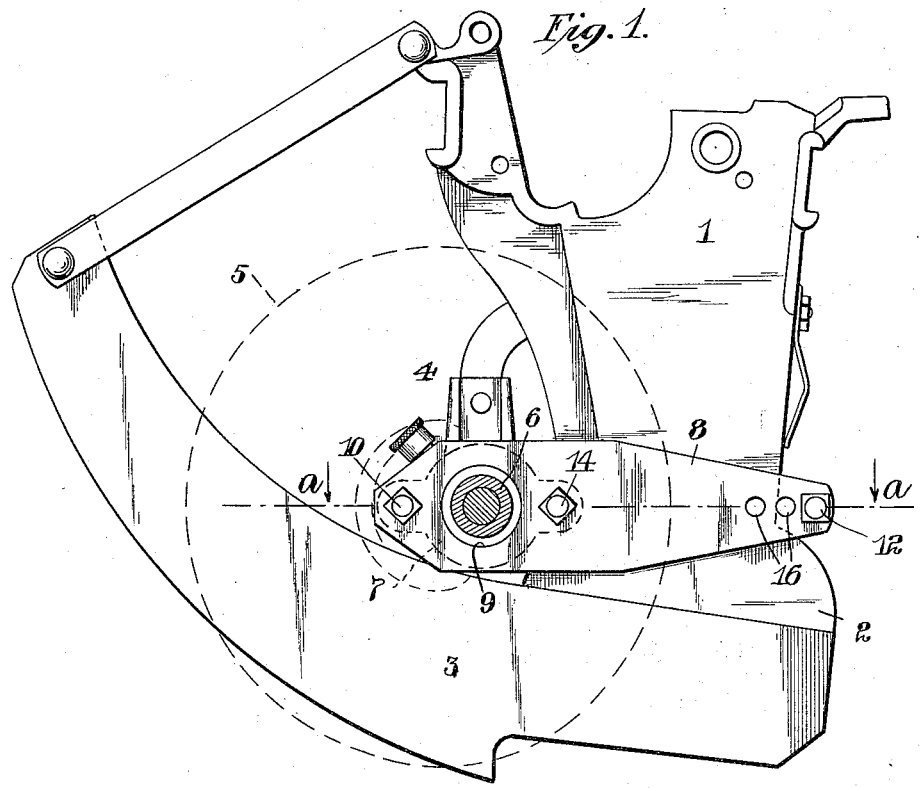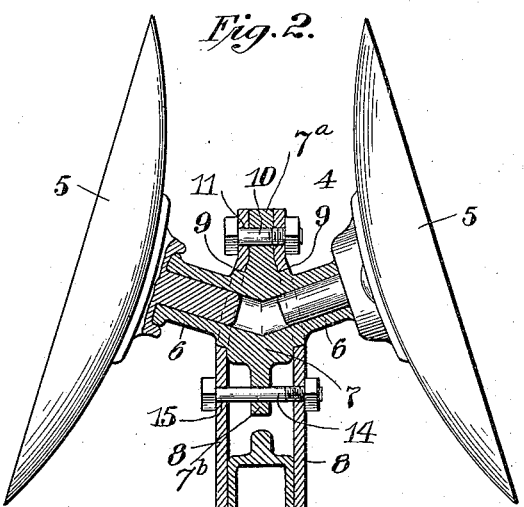

UNITED STATES PATENT OFFICE.

ORBIN F. SMITH, OF MOLINE, ILLINOIS, ASSIGNOR TO MOLINE PLOW COMPANY, A CORPORATION OF ILLINOIS.

FURROW-OPENER ATTACHMENT.

1,159,115.  Specification of Letters Patent.  Patented Nov. 2, 1915.

Application filed January 26, 1915. Serial No. 4,418.

*To all whom it may concern:*

Be it known that I, ORBIN F. SMITH, a citizen of the United States, residing at Moline, in the county of Rock Island and State of Illinois, have invented certain new and useful Improvements in Furrow-Opener Attachments, of which the following is a specification, reference being had therein to the accompanying drawing.

This invention relates to means for the connection of disk furrow opener attachments to seed tubes, more particularly to the upright seed tube of corn planting machines, which tube usually terminates at its lower end in a shoe connected with the rear end of the usual upwardly curved runner characteristic of corn planters.

The object of the invention is to provide a construction by means of which the opener attachment may be held firmly and fixedly in operative relation to the seed tube, but which may be adjusted in various directions to meet the varying conditions encountered in practice with respect to the different forms and sizes of seed tubes and runners, the different depths of planting, and other conditions met with in the practical operation of the machine.

With these and other objects in view, my invention consists of an improved form of clamping device, comprising two opposing clamping plates adapted to be applied to the furrow opener attachment and to the opposite sides of the seed tube, which plates are extended both in front of the furrow opener attachment, and in rear of the seed tube, suitable means being provided for connecting the forward ends of the plates together to cause them to firmly clamp the furrow opener attachment between them, and further means being provided for causing the rear portions of the plates to act with a clamping pressure on the seed tube to sustain the attachment fixedly in proper operative relation to the tube.

In the more specific embodiment of the invention, the clamping device is of a form applicable to a disk furrow opener in which two opposing opener disks are sustained by bearing bosses or sleeves projecting outwardly from a central block or support, the clamping plates being provided with openings through which the bearing bosses respectively extend, and the forward portions of the plates being connected together and to the block by means of a connecting bolt, while the rear portions of the plates are likewise connected together by means of a clamping bolt which extends through openings in the rear ends of the plates and by means of which the plates may be drawn tightly together with a clamping pressure against the sides of the seed tube and thus firmly and fixedly secure the attachment thereto. It is manifest however that the detailed form and arrangement of the parts of the clamping device may be variously changed and modified by the skilled mechanic without departing from the limits of my invention, the particular detailed construction shown being merely one form by way of example; and it will be further understood that the invention is not limited to any particular form or construction of the parts except in so far as such limitations are specified in the claims.

In the accompanying drawings: Figure 1 is a side elevation of a seed tube and runner of a corn planting machine having my invention applied thereto, the near opener disk being shown in dotted lines. Fig. 2 is a horizontal sectional plan view taken on the line *a—a* of Fig. 1. Fig. 3 is a rear perspective view of the parts shown in Fig. 1. Fig. 4 is a perspective view of the clamping plates and their connecting bolts detached.

Referring to the drawings: 1 indicates the upright seed tube of a corn planting machine, 2 the shoe at the lower end of the tube, and 3 the upwardly curved runner connected with the lower end of the tube and extending forwardly and upwardly from the shoe, in the usual manner. These parts are of the usual and familiar construction characteristic of corn planting machines, and in operation, the runner forms a vertical cut in the soil and the shoe serves to open a furrow in which the seed passing downwardly through the tube, is deposited.

4 indicates a furrow opener attachment which in the present instance consists of furrow opening rotary disks 5 situated in front of the seed tube and inclined toward each other at the front, which disks are sustained by outwardly projecting inclined bearing bosses or sleeves 6 extending from a central support or block 7. My improved clamping device is adapted to coöperate with the block 7 and the seed tube 1 in sustaining the furrow opener in front of the seed tube, and in proper operative relation thereto, and it comprises opposing clamping plates 8, 8 which extend horizontally at the opposite sides of the seed tube and the block 7, the said plates terminating at their forward ends in front of the block, and at their rear ends in rear of the seed tube. These plates are provided with circular openings 9, 9 adapted to receive respectively the bosses 6, and they are preferably of such form and material that they will possess some degree of resiliency, so that they may be drawn together on the parts between them with a clamping pressure. At the forward ends the plates are connected together by means of a bolt 10 which is extended through openings 11 in the forward ends of the plates and through a lug 7ª extending forwardly from the block 7. At the rear ends the plates are adapted to be drawn together by means of a bolt 12 extending through bolt openings 13 in the rear ends of the plates in rear of the seed tube; and between the seed tube and block 7, the plates are adapted to be drawn together and clamped on the parts between them, by means of a bolt 14 which is passed through openings 15 in the plates and through a lug 7ᵇ extending rearwardly from the block 7. In the application of the clamping plates to the parts, the plates are applied to the opposite sides of the block 7 and seed tube, with the openings 9 in the plates encircling the bearing bosses 6 on the block, and the three fastening bolts 10, 12 and 14 are passed through the respective openings in the plates, and the nuts on the bolts screwed up to draw the plates forcibly and firmly against the sides of the block and seed tube, whereby the furrow opener attachment will be firmly and fixedly clamped to the tube in proper operative relation thereto. The effect of the engagement of the bosses 6 on the disk support, in the holes 9 in the clamping plates, is to form a detachable interlocking connection between the support and plates, whereby the support will be held in definite relation to the plates, and may by the clamping of the plates to the seed tube, be adjusted bodily relatively thereto.

As a result of the construction described, it will be seen that the furrow opener attachment may be clamped well toward the rear of the runner and in close proximity to the tube, which is the most favorable position for effective operation; and in this position, and by reason of the fact that the openings 9 in the plate encircle or surround the bearing bosses, the parts may be adjusted vertically to the maximum extent, such adjustment being effected by loosening the bolts to permit the proper positioning of the parts, and thereafter tightening them up again to firmly clamp the parts in their adjusted position. The fore and aft adjustment of the attachment in a horizontal direction is provided for by forming in the rear portions of the plates, a number of additional bolt openings 16 to receive the bolt 12.

It will be noted that by reason of the form and construction of the clamping device, it is applicable to seed tubes of different transverse and longitudinal dimensions, and by reason of the fact that the plates are applied to opposite sides of the seed tube and to the opposite sides of the support or block of the furrow opener attachment in symmetrical relations thereto, the latter will be maintained always in a central position with respect to the seed tube, notwithstanding the difference in the widths of the tubes to which the plates are applied.

The device comprises few parts, is simple in construction, and on account of the fact that the bearing bosses of the furrow opener attachment are extended through the openings in the clamping plates, and the latter are connected with the front and rear lugs on the block, the plates will give direct and firm support to the opener attachment, and will maintain the same without liability of displacement, in its proper operative relation to the seed tube.

The front bolt 10 which is extended through the front portions of the clamping plates and through the lug 7ª on the disk supporting block 7, constitutes, in connection with the said lug 7ª, a connection between the front ends of said plates, and due to the fact that this bolt extends through the lug 7ª, and also due to the passage of the bolt 14 through the lug 7ᵇ, the supporting block 7 and the disks carried thereby, are supported by the clamping plates without liability of displacement relatively thereto. As a result, the furrow opener attachment as a whole may be supported from the seed tube through the medium of the clamping plates, in proper operative relation thereto, and this without danger of the tipping or displacement of the supporting block relatively to the plates.

Having thus described my invention, what I claim is:

1. In combination with a disk furrow opener comprising a support having projecting bearing-bosses sustaining opener disks, opposing clamping plates provided with openings to receive said bosses, and means for attaching said clamping plates to a seed tube.

2. In combination with a support provided with laterally projecting bearing-bosses sustaining disk furrow openers, opposing clamping plates applied to the opposite sides of said support and provided with openings to receive the bosses, and means for attaching said plates with a clamping pressure to the opposite sides of a seed tube, to sustain the disk opener in operative fixed relation to said tube.

3. In combination with a block or support provided with bearing-bosses sustaining disk furrow openers, opposed clamping plates applied to the sides of said block and extending in front and in rear of the same, said plates being provided with openings to receive the bearing-bosses, and the rear portions of said plates being adapted to be clamped to a seed tube, and means for connecting the front portions of said plates together.

4. In combination with a block or support provided with bearing-bosses sustaining disk furrow openers, opposing clamping plates applied to the sides of said block and provided with openings in which said bosses respectively extend, the plates being extended longitudinally in front and in rear of the block, means for connecting the front portions of said plates together, and means for connecting the rear portions of said plates together; whereby the said plates may be clamped in rear of the block to a seed tube to sustain the disk openers in operative relation thereto.

5. In combination with a seed tube and a disk furrow opener attachment including a disk support situated in front of the tube, opposing clamping plates extending on opposite sides of the seed tube and support, and respectively in front of the support and in rear of the seed tube, said plates being detachably interlocked between their ends with the disk support, means connecting the plates together in front of the disk support to apply a clamping pressure to the sides of the same, and means connecting the plates together in rear of the seed tube to apply a clamping pressure to the sides of the latter.

6. An upright seed tube, and a disk furrow opener attachment comprising a block or support situated in front of the tube, and laterally extending bosses giving support to opener disks, in combination with opposing clamping plates applied to the sides of the block or support and provided with openings in which said bosses respectively extend, said plates being extended rearwardly along the sides of the seed tube and terminating in rear of the same, means for drawing the plates together in rear of the tube with a clamping action, and means for connecting the front portions of the plates together.

7. In combination with a disk furrow opener comprising a support having projecting bearing bosses sustaining opener disks, opposing clamping plates provided with openings to receive said bosses, means for attaching said plates to the forward portion of the support, means for attaching said plates to the rear portion of the support, and means for attaching said plates to a seed tube.

8. In combination with a disk furrow opener comprising a support sustaining opener disks and provided with front and rear lugs, each having a horizontal opening therethrough, opposing clamping plates applied to the opposite sides of said support and lugs, a horizontal clamping bolt extending through the plates and the front lug, a horizontal clamping bolt extending through the plates and the rear lug, whereby the support may be clamped firmly between the plates and the parts held against displacement relatively to each other, and means for attaching the clamping plates to a seed tube.

In testimony whereof, I have affixed my signature in presence of two witnesses.

ORBIN F. SMITH.

Witnesses:
L. C. BLANDING,
JAMES J. LAMB.